(12) United States Patent
Pugh

(10) Patent No.: US 7,756,835 B2
(45) Date of Patent: Jul. 13, 2010

(54) DATABASE AND OPERATING SYSTEM INDEPENDENT COPYING/ARCHIVING OF A WEB BASE APPLICATION

(75) Inventor: William A. Pugh, Seattle, WA (US)

(73) Assignee: BEA Systems, Inc., San Jose, CA (US)

( * ) Notice: Subject to any disclaimer, the term of this patent is extended or adjusted under 35 U.S.C. 154(b) by 2046 days.

(21) Appl. No.: 09/816,887

(22) Filed: Mar. 23, 2001

(65) Prior Publication Data
US 2002/0143785 A1 Oct. 3, 2002

(51) Int. Cl.
G06F 17/00 (2006.01)
(52) U.S. Cl. .................................................... 707/667
(58) Field of Classification Search ............ 395/200.03, 395/700, 707, 650, 200.31, 200.47, 200.55; 705/59; 707/1–10, 100, 101, 102–103, 104, 707/107, 204, 999.102, 667; 709/203, 223, 709/225, 246; 713/200, 201
See application file for complete search history.

(56) References Cited

U.S. PATENT DOCUMENTS

| | | | | |
|---|---|---|---|---|
| 5,740,445 | A * | 4/1998 | Okuda | 707/102 |
| 5,893,107 | A * | 4/1999 | Chan et al. | 707/103 R |
| 6,026,402 | A * | 2/2000 | Vossen et al. | 707/9 |
| 6,052,693 | A * | 4/2000 | Smith et al. | 707/104.1 |
| 6,208,993 | B1 * | 3/2001 | Shadmon | 707/102 |
| 6,282,548 | B1 | 8/2001 | Burner et al. | |
| 6,282,653 | B1 | 8/2001 | Berstis et al. | |
| 6,604,106 | B1 * | 8/2003 | Bodin et al. | 707/102 |
| 6,633,878 | B1 * | 10/2003 | Underwood | 707/100 |
| 6,651,096 | B1 * | 11/2003 | Gai et al. | 709/223 |
| 6,823,338 | B1 * | 11/2004 | Byrne et al. | 707/9 |
| 7,219,302 | B1 * | 5/2007 | O'Shaughnessy et al. | 715/752 |
| 2002/0010682 | A1 | 1/2002 | Johnson | |
| 2005/0131919 | A1 * | 6/2005 | Brookler et al. | 707/100 |

OTHER PUBLICATIONS

International Search Report for PCT/US02/08900 mailed Jun. 11, 2002.

* cited by examiner

*Primary Examiner*—Charles Rones
*Assistant Examiner*—Mellissa M Chojnacki
(74) *Attorney, Agent, or Firm*—Squire, Sanders & Dempsey, LLP

(57) ABSTRACT

A web based application having non-file system structures is copied or archived by first initializing a file to store the web based application, including creation of a root directory within the file. Then, data directories are created under the root directory, and a number of storage data objects under the data directories are initialized for all non-file system structures of the web based application. Thereafter, the non-file system structures are copied and stored into the storage data objects. In embodiments where the web based application further includes files that are part of a file system, the files are stored as additional storage data objects under the root directory. Accordingly, database and operating system independence is achieved.

14 Claims, 9 Drawing Sheets

600

```xml
<web xmlversion="2.0" webversion="3.0"
  originalname="assetmanagerModule.westside.com">
  <timezone>US Pacific</timezone>
  <signupmode>1</signupmode>
  <objects>
    <datatable name="wsam_location"
        path="/wsAssetManager/Lookups/">
      <data name="wsam_location_data.xml" format="SS7Xml" />
    </datatable>
    <datatable name="wsam_category"
        path="/wsAssetManager/Lookups/">
      <data name="wsam_category_data.xml" format="SS7Xml" />
    </datatable>
    <datatable name="wsam_vendor"
        path="/wsAssetManager/Lookups/">
      <data name="wsam_vendor_data.xml" format="SS7Xml" />
    </datatable>
    <datatable name="wsam_status"
        path="/wsAssetManager/Lookups/">
      <data name="wsam_status_data.xml" format="SS7Xml" />
    </datatable>
    <datatable name="wsam_assets" path="/wsAssetManager/">
      <data name="wsam_assets_data.xml" format="SS7Xml" />
    </datatable>
    <datatable name="wsam_settings" path="/wsAssetManager/">
      <data name="wsam_settings_data.xml" format="SS7Xml" />
    </datatable>
  </objects>
</web>
```

```xml
<DATA>
  <COLUMNS XmlVersion="2">
    <COLUMN CName="RowId" CType="Integer" CId="1">
      <PK>PK</PK>
      <CAPTION>RowId</CAPTION>
      <DESC>An auto-incrementing value that uniquely identifies
          each record in the table.</DESC>
      <HIDDEN>Hidden</HIDDEN>
    </COLUMN>
    <COLUMN CName="RowVersion" CType="Integer" CId="2">
      <CAPTION>RowVersion</CAPTION>
      <DESC>The number of times the record has been
          updated.</DESC>
      <HIDDEN>Hidden</HIDDEN>
    </COLUMN>
    <COLUMN CName="OwnedBy" CType="User" CId="3">
      <CAPTION>OwnedBy</CAPTION>
      <DESC>The user ID of the member who created the
          record.</DESC>
      <LOOKUP>AddressBook</LOOKUP>
      <DISPLAYFIELD>UserName</DISPLAYFIELD>
      <HIDDEN>Hidden</HIDDEN>
    </COLUMN>
    <COLUMN CName="Created" CType="Date" CId="4">
      <CAPTION>Created</CAPTION>
      <DESC>The date the record was created.</DESC>
      <HIDDEN>Hidden</HIDDEN>
    </COLUMN>
    <COLUMN CName="ModifiedBy" CType="User" CId="5">
      <CAPTION>ModifiedBy</CAPTION>
      <DESC>The user ID of the member who last modified the
          record.</DESC>
      <LOOKUP>AddressBook</LOOKUP>
      <DISPLAYFIELD>UserName</DISPLAYFIELD>
      <HIDDEN>Hidden</HIDDEN>
    </COLUMN>
    <COLUMN CName="Modified" CType="Date" CId="6">
      <CAPTION>Modified</CAPTION>
      <DESC>The date the record was last modified.</DESC>
      <HIDDEN>Hidden</HIDDEN>
    </COLUMN>
    <COLUMN CName="location" CType="Text" CId="7">
      <CAPTION>location</CAPTION>
    </COLUMN>
  </COLUMNS>
```

Figure 7a

```
<scriptset>
    <script type="library" id="1" name="Library" comment=""
        enable="on" />
    <script type="delete" id="2" name="OnDelete" comment=""
        enable="on">
        <delete enable="on" custom="" use="auto" id="3" />
        <catch enable="off" custom="" use="auto" id="4" />
        <finally enable="off" custom="" use="auto" id="5" />
    </script>
    <script type="insert" id="6" name="OnInsert" comment=""
        enable="on">
        <insert enable="on" custom="" use="auto" id="7" />
        <catch enable="off" custom="" use="auto" id="8" />
        <finally enable="off" custom="" use="auto" id="9" />
    </script>
    <script type="update" id="10" name="OnUpdate" comment=""
        enable="on">
        <update enable="on" custom="" use="auto" id="11" />
        <catch enable="off" custom="" use="auto" id="12" />
        <finally enable="off" custom="" use="auto" id="13" />
    </script>
</scriptset>
</DATA>
```

```xml
<root>
  <wsam_location>
      <RowId>1</RowId>
      <RowVersion>2</RowVersion>
      <OwnedBy>appsDev</OwnedBy>
      <Created>2001-01-05 12:03:53</Created>
      <ModifiedBy>appsDev</ModifiedBy>
      <Modified>2001-02-20 15:45:02</Modified>
      <location>Home Office</location>
  </wsam_location>
  <wsam_location>
      <RowId>2</RowId>
      <RowVersion>2</RowVersion>
      <OwnedBy>appsDev</OwnedBy>
      <Created>2001-01-05 12:03:53</Created>
      <ModifiedBy>appsDev</ModifiedBy>
      <Modified>2001-02-20 15:45:17</Modified>
      <location>Seattle Office</location>
  </wsam_location>
  <wsam_location>
      <RowId>3</RowId>
      <RowVersion>2</RowVersion>
      <OwnedBy>appsDev</OwnedBy>
      <Created>2001-01-05 12:03:53</Created>
      <ModifiedBy>appsDev</ModifiedBy>
      <Modified>2001-02-20 15:45:34</Modified>
      <location>New York Office</location>
  </wsam_location>
  <wsam_location>
      <RowId>4</RowId>
      <RowVersion>2</RowVersion>
      <OwnedBy>appsDev</OwnedBy>
      <Created>2001-01-05 12:03:53</Created>
      <ModifiedBy>appsDev</ModifiedBy>
      <Modified>2001-02-20 15:45:50</Modified>
      <location>Portland Office</location>
  </wsam_location>
  <wsam_location>
      <RowId>5</RowId>
      <RowVersion>2</RowVersion>
      <OwnedBy>appsDev</OwnedBy>
      <Created>2001-01-05 12:03:53</Created>
      <ModifiedBy>appsDev</ModifiedBy>
      <Modified>2001-02-20 15:46:06</Modified>
      <location>San Fransisco Office</location>
  </wsam_location>
</root>
```

DATABASE AND OPERATING SYSTEM INDEPENDENT COPYING/ARCHIVING OF A WEB BASE APPLICATION

BACKGROUND OF THE INVENTION

1. Field of the Invention

The present invention relates to the field of data processing. More specifically, the present invention relates to the copying or archiving of web sites or web based applications that include files that are part of a file system as well as non-file system structures.

2. Background Information

With advances in integrated circuit, microprocessor, networking and communication technologies, increasing number of devices, in particular, digital computing devices, are being networked together. As a result of this trend of increased connectivity, increasing number of applications that are network dependent are being deployed. Examples of these network dependent applications include but are not limited to, email, net-based telephony, world wide web (WWW) and various types of web based e-commerce, commonly referred to as web sites or web based applications (hereinafter, simply web based applications). Further, increasing number of software applications that were traditionally licensed or distributed through discrete distribution medium, such as diskettes, CDROMs and the like, are being distributed online or offered as web based applications, through private intranets or public networks like the Internet.

Modern web based applications often include numerous files that are part of a file system as well as a substantial number of non-file system structures. Examples of these non-file system structures include but are not limited data tables of the web based applications, schemas of the data tables, users of the web based applications, and so forth (see e.g. top portion of FIG. 1). Often times, whether it is for the purpose of backing up a web based application, for porting an application (or a portion thereof) or other reasons of the like, it is desirable to be able to efficiently copy/archive the application (or the portion of interest).

Under the prior art, the various parts are typically copied or archived as separate pieces in a database and/or operating system dependent manner. For examples, a file system utility would be employed to copy/archive the files, whereas a database utility would be employed to copy/archive the data tables and their schemas. Accordingly, under the prior art, the copying/archiving process is cumbersome, inefficient, as well as being database and operating system dependent.

Thus, a more efficient approach to copying/archiving a web base application, in particular, an approach that is database and operating system independent, is desired.

SUMMARY OF THE INVENTION

A web based application having non-file system structures is copied or archived by first initializing a file to store the web based application, including creation of a root directory within the file. Then, data directories are created under the root directory, and a number of storage data objects under the data directories are initialized for all non-file system structures of the web based application. Thereafter, the non-file system structures are copied and stored into the storage data objects. In embodiments where the web based application further includes files that are part of a file system, the files are stored as additional storage data objects under the root directory.

Accordingly, improved usability, efficiency, as well as database and operating system independence are achieved.

BRIEF DESCRIPTION OF DRAWINGS

The present invention will be described by way of exemplary embodiments, but not limitations, illustrated in the accompanying drawings in which like references denote similar elements, and in which:

FIG. 6 illustrates an example structure description of a web based application being copied/archived;

FIGS. 7a-7b illustrate an example data table schema of a data table of a web based application being copied/archived; and FIG. 8 illustrates an example data table of a web based application being copied/archived.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by a processor based device, using terms such as data, table, schema, log-in names, initializing, creating, storing, retrieving, determining, and the like, consistent with the manner commonly employed by those skilled in the art to convey the substance of their work to others skilled in the art. As well understood by those skilled in the art, the quantities take the form of electrical or magnetic capable of being stored, transferred, combined, and otherwise manipulated through mechanical and electrical components of the processor based device; and the term processor include microprocessors, micro-controllers, digital signal processors, and the like, that are standalone, adjunct or embedded. Further, for the purpose of this application, the terms "web site" and "web based application" should be considered synonymous and interchangeable.

Various operations will be described as multiple discrete steps in turn, in a manner that is most helpful in understanding the present invention, however, the order of description should not be construed as to imply that these operations are necessarily order dependent. In particular, these operations need not be performed in the order of presentation. Further, the description repeatedly uses the phrase "in one embodiment", which ordinarily does not refer to the same embodiment, although it may.

Overview

Figure 1:
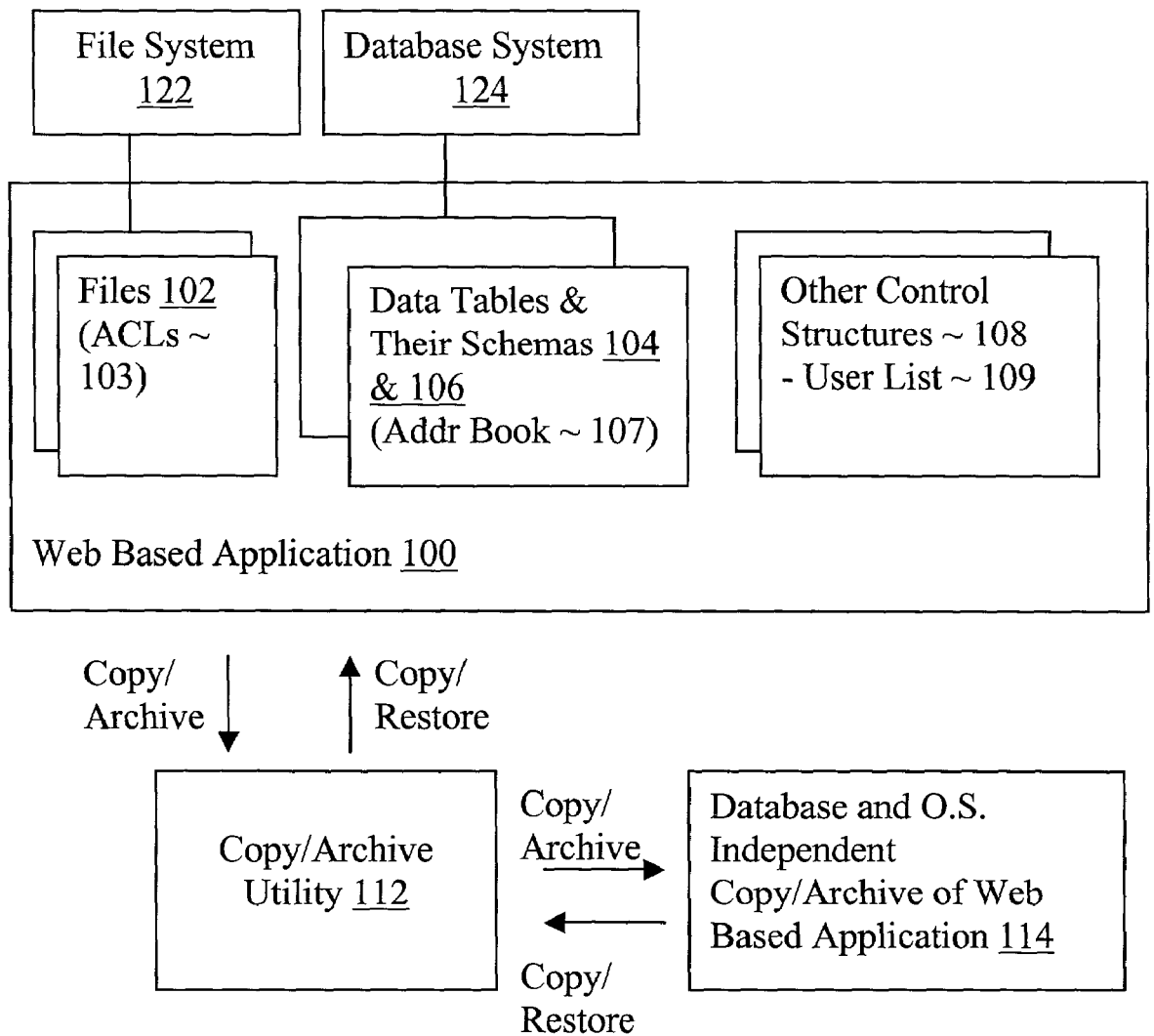
FIG. 1 illustrates an overview of a typical modern web based application and the copying/archiving utility of the present invention, in accordance with one embodiment.

Referring now to FIG. 1, wherein a block diagram illustrating an overview of a web based application, the copy/archive utility of the present invention, and the resulting copy, in accordance with one embodiment, is shown. As illustrated and alluded to earlier, web based application 100 includes files 102 that are part of file system 122 of an operating system (not shown), and non-file system structures 104-108. At least some of files 102 have associated access control lists (ACL). Non-file system structures 104-108 include in particular data tables 104 and their schemas 106 of database system 124. Further, non-file system structures 104-108 include other control structures 108. Of particular interest among data tables 106 is address table 107, and among control structures 108 is user list 109. The number and content of files 102 as well as data tables 104 and their schemas 106 are application dependent. Their internal organizations are of course operating system and database dependent. That is, if web based application 100 is deployed on operating system OS-1 employing database DB-1, the internal organization of files 102 and data tables 104 (and their schemas 106) would be different, had web based application 100 been deployed on operating system OS-2 employing database DB-2 instead. The relevant information contained in ACLs 103 includes the access control information for corresponding files 102. The relevant information contained in user list 109 includes authorized users of web based application 100. The relevant information contained in address book 107 typical includes the basic properties of the users, such as their names, email addresses, and log-in user names for the domain web based application 100 is installed or deployed.

As illustrated, and will be described in further detail below, copy/archive utility 112 incorporated with the teachings of the present invention, may advantageously make a copy of web based application 100 in its entirety. Further, the internal organization of resulting copy 114 is independent of file system 122 and database 124 (or their underlying operating system), on which web based application 100 is deployed. Accordingly, the present invention is particularly useful in facilitating archiving and/or porting of web based application 100.

Note that while the preceding paragraph refers to the advantage of the present invention in copying a web based application 100 in "its entirety" (e.g. in an archiving situation or in a total porting situation), however it will be readily apparent from the description to follow that the present invention may also be advantageously employed to port a portion of an application, e.g. from one developer or developer vendor to another, to be combined with another portion or portions of the application.

Before describing the present invention in further detail, it should be noted that while the preferred embodiment to be described advantageously copy web based application 100 in its entirety into a single file, in alternate embodiments, application 100 may be copied into one or more files in like manner without detracting from achieving the desired database and operating system independence.

Copying/Archiving

Figure 2:
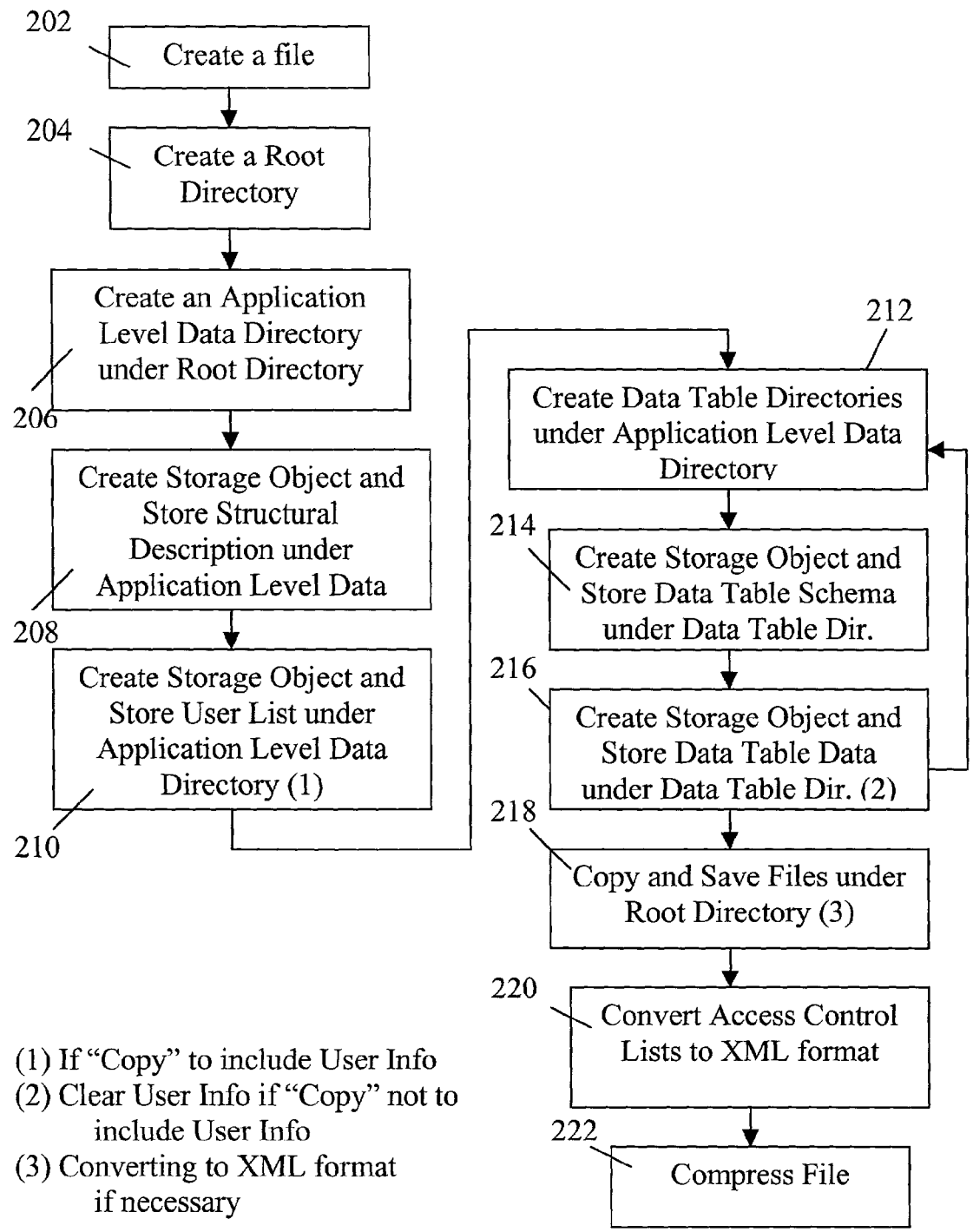
FIG. 2 illustrates the relevant operational flow of the copying/archiving utility of FIG. 1, in support of the copying/archiving process of the present invention.
Figure 3:
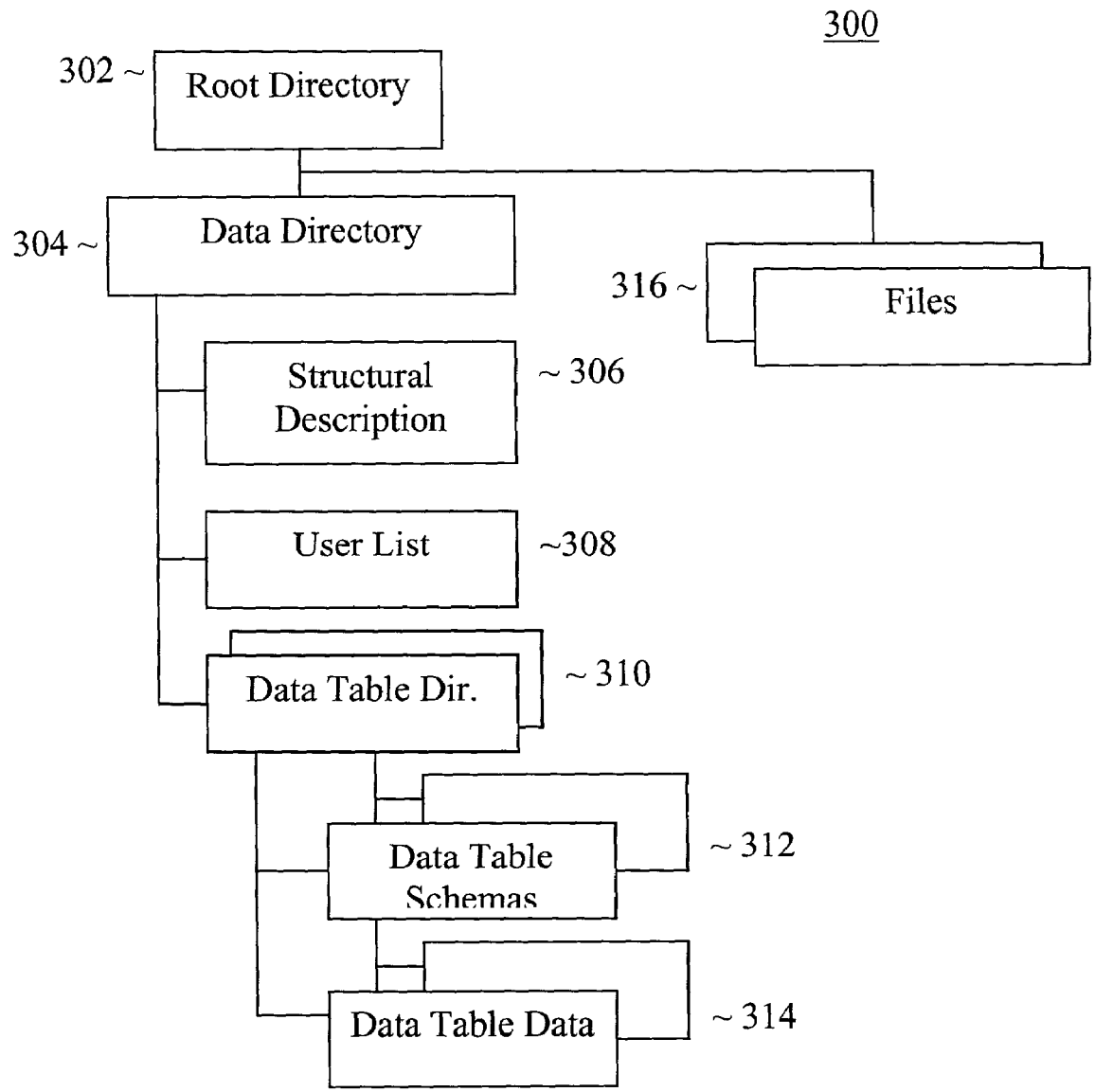
FIG. 3 illustrates the organization of the resulting database and operating system independent copy of the web based application of FIG. 1, in accordance with one embodiment.

Referring now to FIGS. 2-3, wherein two block diagrams illustrating the relevant operational flow of copy/archive utility 112 of FIG. 1 in support of the DB and OS independent manner of copying/archiving of the present invention, and the resulting DB and OS independent copy, respectively, in accordance with one embodiment, are shown. Copy/archive utility 112 is assumed to have at least the capability of interacting with the operating system, more specifically, its file system 122, and the database 124, under which web based application 100 is implemented. Such capabilities include e.g. the ability to request and receive data and associated control information from the database and the file system in the manner required by the database and the file system. In one embodiment, copy/archive utility 112 also supports an operation option for copying/archiving an application with or without the user information.

As illustrated, the DB and OS independent approach to copying/archiving process of the present invention starts at block 202, with the creation and initialization of the resulting file, file 300. In preferred embodiments, resultant file 300 is a file that may be subjected to compression. More specifically, in various preferred embodiments, copy/archive utility 112 creates/initializes a "zippable" file as resultant file 300.

Upon creating/initializing file 300, copy/archive utility 112 creates root directory 302 in file 300, block 204. Thereafter, copy/archive utility 112 creates an application level data directory 304 under root directory 302, block 206. Next, copy/archive utility 112 creates and initializes two storage objects 306-308 under data directory 304, blocks 208-210. At block 208, copy/archive utility 112 further stores a structural description of web based application 100 into first storage object 306. As described earlier, the structural description of web based application 100 enumerates the parts that make up application 100, such as its files, their pathnames, the data tables, their schemas, and so forth. In preferred embodiments, the structural description is expressed using a mark up language, more specifically, XML. An example of one such structural description 600 is shown in FIG. 6. At block 210, assuming the copying/archiving with user information option is selected, copy/archive utility 112 further stores a user description of the users of web based application 100 in the second storage object 308. In preferred embodiments, the users are similarly described employing XML (not shown).

Thereafter, using the structural information of web based application 100 as a guide, copy/archive utility 112 creates a number of data table directories 310 under data directory 304, and creates and initializes a number of storage objects 312-314 under the corresponding data table directories 310 to store data tables' data 104 and their schemas 106, blocks 212-216. In one embodiment, a pair of data table data and data table schema 104-106 is stored under each data table directory 310. Of course, in alternate embodiments, more than one pair of data table data and data table schema 104-106 may be stored under each data table directory 310 instead. At blocks 214-216, copy/archive utility 112 further stores data tables' data 104 and their schemas 106 (including address table 107 if applicable), into storage objects 314 and 312 respectively. If copying/archiving of address table 107 is also included, the user information are included or excluded in accordance with the operation option selected. Again, in preferred embodiments, data tables 104 and their schemas 106 (including address table 107 if applicable), are described employing XML.

One example each for how a data table schema 106 and a data table's data 104 is described as they are stored into the storage objects are illustrated in FIGS. 7a-7b and 8 respectively. As illustrated, the storage of a data table schema 106 includes identifications and descriptions of the columns of the corresponding data table, such as their captions, whether the columns are "hidden" and so forth. Further, the storage of a data table schema 106 also includes identification and descriptions of the associated scripts. The storage of a data table's data 104 on the other hand includes identifications and descriptions of the rows of the data table, such as their row identifications, their owners (if user information are to be included), creation dates and so forth.

Continuing to refer to FIGS. 2-3, upon copying/archiving data tables' data 104 and their schemas 106, copy/archive utility 112 copies files 102 of file system 122 into file 300, placing them as data objects 316 under root directory 300, block 218. In one embodiment, files 102 that are not in XML format are converted into XML format. Thereafter, at block 220, copy/archive utility 112 further converts the ACLs of applicable ones of files 102 (which is normally kept in a binary format) to XML format.

Lastly, for the copying/archiving process of the illustrated embodiment, copy/archive utility 112 invokes a compression function to compress or "zip up" file 300, block 222. The compression function may be any one of a number of such functions or utilities known in the art.

Thus, it can be seen from the above description, a web based application (or portion thereof, and regardless whether it is "fully" or "partially" developed) may be efficiently copied into a single or multiple files. Further, under the present invention, the content of file 300, once unzipped/decompressed, is advantageously humanly readable, as well as open to manipulation by any one of a number of common "editing" tools known in the art.

Copying/Restoring

Figure 4:
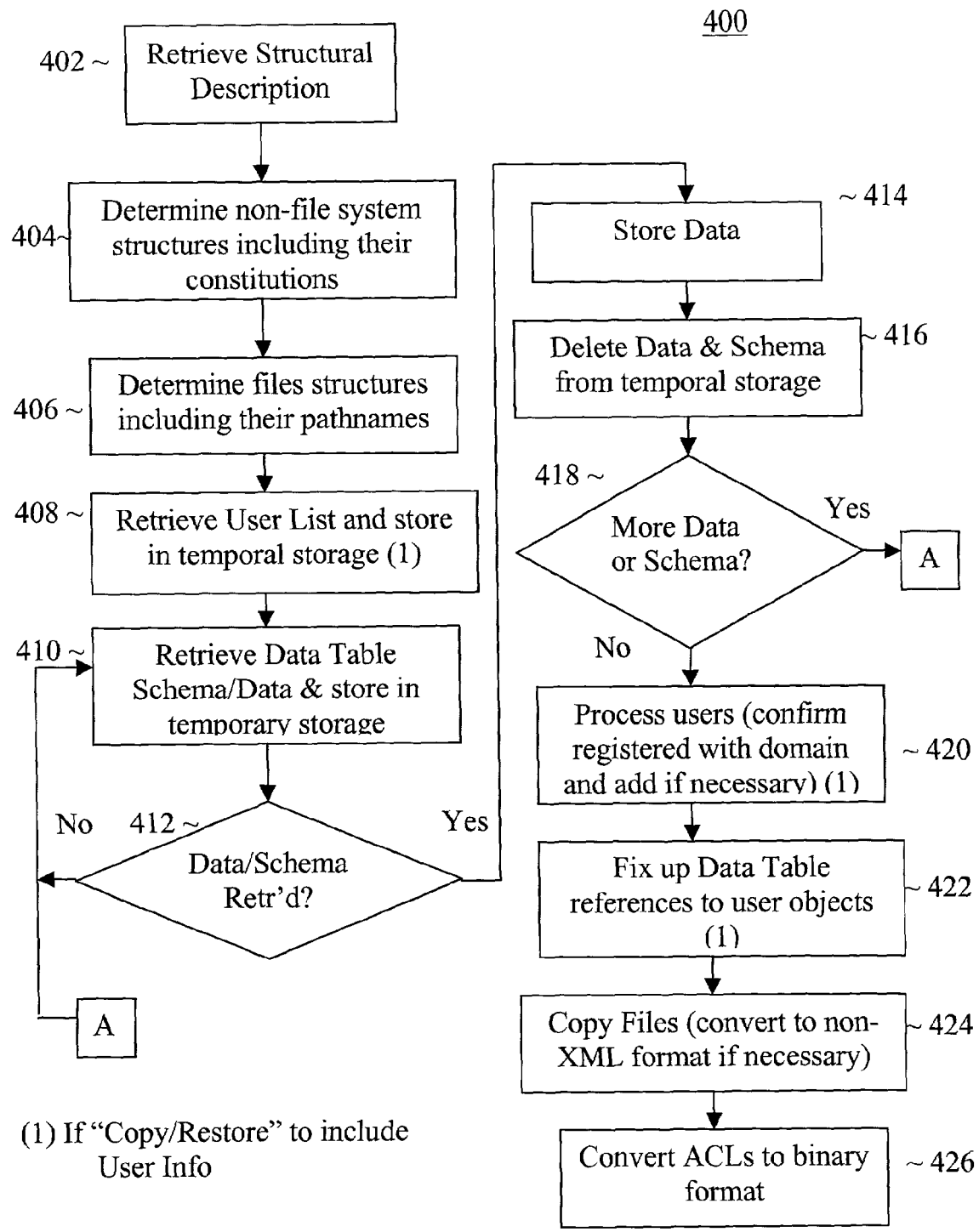
FIG. 4 illustrates the relevant operational flow of the copying/archiving utility of FIG. 1, in support of the copying/restoring process of the present invention.

Referring now to FIG. 4, wherein a block diagram illustrating the relevant operational flow of copy/archive utility 112 of FIG. 1 in support of the DB and OS independent manner of copying/restoring of the present invention, in accordance with one embodiment, is shown. The description of the copying/restoring process illustrated in FIG. 4, will also continue to reference FIG. 3, wherein the internal organization of the DB and OS independent resultant file 300, in accordance with one embodiment, is illustrated. Again, copy/archive utility 112 is assumed to have at least the capability of interacting with the operating system, more specifically, its file system, and the database, of the target domain, to which web based application 100 is being copied/restored into. Such capabilities include e.g. the ability to provide data and associated control information, and request their storage, of the database and the file system, in the manner required by the database and the file system. In one embodiment, copy/archive utility 112 also supports an operation option for copying/restoring an application with or without the user information. Obviously, the option has no substantive effect if the application was not copied/archived with user information. In a preferred embodiment, the copying/restoration still proceeds with a "warning" message informing the user that user information was not present.

As shown, for the embodiment, the copying/restoring process starts at block 402 with copy/archive utility 112 retrieving the structural description of web based application 100 from storage object 306 (upon unzipping or decompressing file 300, if it was zipped/compressed). Upon retrieval, at block 404, copy/archive utility 112 determines the non-file system structures 104-108 of web based application 100, including the constitutions of these structures 104-108. For example, in the case of data tables 104, identifying their schemas 106. At block 406, copy/archive utility 112 determines the file make-ups 104 of web based application 100, including the files' pathnames. Next, at block 408, assuming the copy/restore operation is to include user information and the information are present in file 300, copy/archive utility 112 retrieves the user description of web based application 100 from storage object 308.

Thereafter, at blocks 410-418, copy/archive utility 112 successively retrieves data table schemas 104 and data tables 106 (packaged in a self-describing format, such as XML) from their storage objects 312-314. For each retrieved data table schema 106 or data table 104, copy/archive utility 112 stores the retrieved data table schema 106 or the retrieved data table 104 (in the self-describing format) in temporary storage (block 410). If the retrieved item is a data table schema 106, copy/archive utility 112 determines if the corresponding data table 104 has been retrieved, block 412. Likewise, if the retrieved item is a data table 104, copy/archive utility 112 determines if the corresponding data table schema 106 has been retrieved, block 412. In each case, if both the data table schema 106 and the corresponding data table 104 have been retrieved and stored into temporary storage, the data table 104 is re-created under the database system 124 of the domain within which web based application 100 is being installed or restored into, and the data are imported into the re-created table 104, block 414. Upon importing the data of the data table into the re-created data table 104, copy/archive utility 112 deletes the retrieved data table schema 106 and retrieved data table 104 from their temporal storage locations, block 416. Note that in alternate embodiments, data table schemas 106 and data tables' data 104, may be retrieved from file 300 and imported into the target schemas/tables without employing intermediate temporary storage.

Back at block 412, if the corresponding data table schema 106 or data table 104 has not been retrieved, copy/archive utility 112 returns to block 410, as it is "guaranteed" that there is at least one other data item to be retrieved. On the other hand, if the corresponding data table schema 106 or data table 104 has been retrieved, upon performing the earlier described importation and clean up of the temporary storage, copy/archive utility 112 continues at block 418, wherein a determination is made on whether there is at least one other data item to be retrieved and restored. If so, the process returns to block 410, otherwise the process continues at block 420.

At block 420, if the user list was retrieved back at block 408, the retrieved user list is processed. Assuming the domain to which web based application 100 is being copied/restored into supports a programming interface for adding log-in users, the processing includes, for each user of web based application 100, copy/archive utility 112 checking with the registration service of the target domain to determine if the user is a registered user of the target domain. If not, in a preferred embodiment, copy/archive utility 112 registers the user with the target domain.

Next at block 422, again assuming user information are to be included, and they were retrieved, copy/archive utility 112 proceeds to fix up references to users/user objects included in data tables 104. In particular, where address book 107 includes the log-in user names of at least some of users having address entries in address book 107, copy/archive utility 112 updates the log-in user names of the users of web based application 100 with the log-in user names of the users for the copy/restore target domain. In various embodiments, the fix-up operations also include conditionally deleting the user log-in names from address table 107, when address table 107 was initially imported. Further, in various embodiment, the fix-up operations also include determining if a user already has a corresponding address entry in address table 107, if not creating the corresponding address entry in address table 107.

Thereafter, at block 422, copy/archive utility 112 retrieves files 102 from storage objects 316, and stores them under file system 122 of the target domain. For the illustrated embodiment, recall an ACL file is converted into an XML format during the "copying" process. Accordingly during the "restoration" process, copy/archive utility 112 converts the ACLs back into a binary format. Additionally, if any of files 102 are to be stored in a format other than XML format, the files are converted accordingly. In various embodiments, the conversion requirements are described as part of the XML format.

Accordingly, the database and operating system independent copy 300 of web based application 100 may be used as a back up/restoration copy, or may be used as a copy to port application 100 (in whole or in part, regardless application 100 is fully or partially developed) to another domain of like or different execution environment.

Example Computer System

Figure 5:
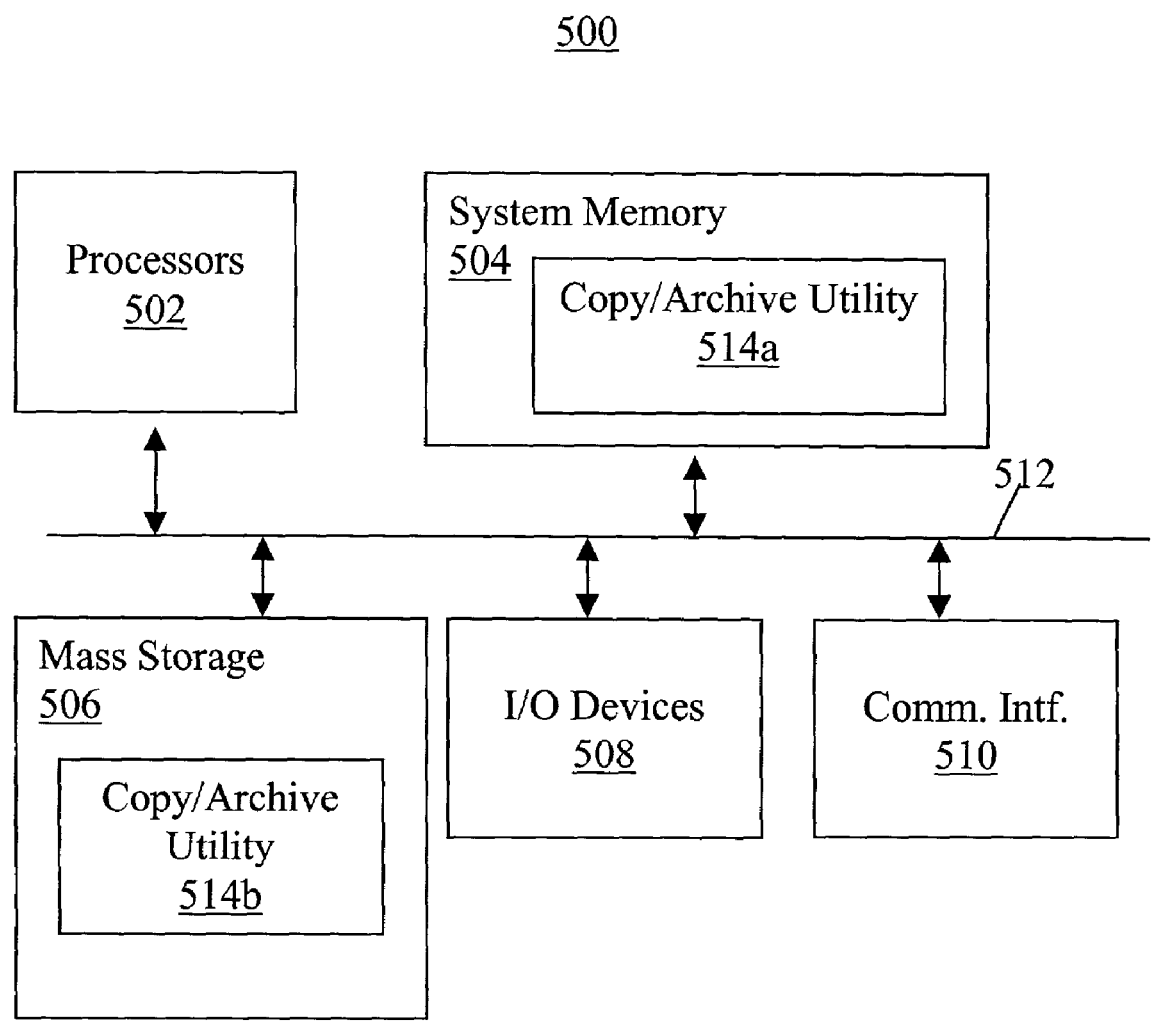
FIG. 5 illustrates an internal component view of a computer system suitable for use to practice the present invention, in accordance with one embodiment.

FIG. 5 illustrates an example computer system suitable for use to practice the present invention in accordance with one embodiment. As shown, computer system 500 includes one or more processors 502 and system memory 504. Additionally, computer system 500 includes mass storage devices 506 (such as diskette, hard drive, CDROM and so forth), input/output devices 508 (such as keyboard, cursor control and so forth) and communication interfaces 510 (such as network interface cards, modems and so forth). The elements are coupled to each other via system bus 512, which represents one or more buses. In the case of multiple buses, they are bridged by one or more bus bridges (not shown). Each of these elements performs its conventional functions known in the art. In particular, system memory 504 and mass storage 506 are employed to store a working copy and a permanent copy of the programming instructions implementing the copy/archive utility of the present invention (or a component incorpating the copy/archive utility). The permanent copy of the programming instructions may be loaded into mass storage 506 in the factory, or in the field, as described earlier, through a distribution medium (not shown) or through communication interface 510 (from a distribution server (not shown). The constitution of these elements 502-512 are known, and accordingly will not be further described.

Conclusion and Epilog

Thus, an improved method and apparatus for efficiently copying/archiving a web based application has been described. While the present invention has been described in terms of the above illustrated embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. A computer implemented method of copying an application that comprises a plurality of parts, wherein the parts comprise non-file system structures including a data table and corresponding schema, the method comprising:
   initializing a resulting file;
   creating a root directory within the resulting file;
   creating an application level data directory under the root directory;
   creating one or more storage objects under the application level directory;
   storing a structural description of the application in a first storage object, wherein the structural description comprises a listing of the plurality of parts of the application;
   creating one or more data table directories under the application level data directory based on the structural description, wherein at least one of the data table directories is a directory to a first data table data storage object and a first data table schema storage object; and
   copying, from the application, the data table to the first data table data storage object and the schema to the first data table schema storage object;
   wherein the application is a web based application and the structural description, data table, and schema are each an XML file.

2. The method of claim 1, wherein said initializing comprises initializing a compressible file.

3. The method of claim 1, wherein the non-file system structures further comprising:
   initializing a user list storage object under said application level data directory to store a user description describing users of the application; and
   copying and storing said user description in said user list storage object.

4. The method of claim 1, the application comprising files and an application control list, the method further comprising copying the files under the root directory.

5. The method of claim 4, further comprising converting the application control list into an XML format.

6. An apparatus comprising:
   a storage medium having stored therein programming instructions, when executed, operate the apparatus to copy an application that comprises a plurality of parts, wherein the parts comprise non-file system structures including a data table and corresponding schema by:
   initializing a resulting file; creating a root directory within the resulting file;
   creating an application level data directory under the root directory;
   creating one or more storage objects under the application level directory;
   storing a structural description of the application in a first storage object, wherein the structural description comprises an enumeration of the plurality of parts of the application;
   creating one or more data table directories under the application level data directory based on the structural description, wherein at least one of the data table directories is a directory to a first data table data storage object and a first data table schema storage object; and
   copying, from the application, the data table to the first data table data storage object and the schema to the first data table schema storage object;
   wherein the application is a web based application and the structural description, data table, and schema are each an XML file.

7. The apparatus of claim 6, wherein said programming instructions, when executed, operate the apparatus to initialize a compressible file to store said application.

8. The apparatus of claim 6, wherein said programming instructions, when executed, operate the apparatus to:
   initializing a user list storage object under said application level data directory to store a user description describing users of the application; and copying and storing said user description in said user list storage object.

9. The apparatus of claim 6, the application comprising files and an application control list, the apparatus further comprising copying the files under the root directory.

10. The apparatus of claim 9, further comprising converting the application control list into an XML format.

11. A computer-readable medium having programming instructions executable by a processor stored thereon that cause the processor to:
  copy an application that comprises a plurality of parts, wherein the parts comprise non-file system structures including a data table and corresponding schema, the copying comprising:
  initializing a resulting file; creating a root directory within the resulting file; creating an application level data directory under the root directory; creating one or more storage objects under the application level directory;
  storing a structural description of the application in a first storage object, wherein the structural description comprises a listing of the plurality of parts of the application;
  creating one or more data table directories under the application level data directory based on the structural description, wherein at least one of the data table directories is a directory to a first data table data storage object and a first data table schema storage object; and
  copying, from the application, the data table to the first data table data storage object and the schema to the first data table schema storage object;
  wherein the application is a web based application and the structural description, data table, and schema are each an XML file.

12. The computer-readable medium of claim 11, wherein said programming instructions, when executed, operate the processor to:
  initializing a user list storage object under said application level data directory to store a user description describing the users of the application; and copying and storing said user description in said user list storage object.

13. The computer-readable medium of claim 11, the application comprising files and an application control list, the processor further comprising copying the files under the root directory.

14. The computer-readable medium of claim 13, further comprising converting the application control list into an XML format.

* * * * *

UNITED STATES PATENT AND TRADEMARK OFFICE
CERTIFICATE OF CORRECTION

PATENT NO.        : 7,756,835 B2                                   Page 1 of 1
APPLICATION NO.   : 09/816887
DATED             : July 13, 2010
INVENTOR(S)       : William A. Pugh It is certified that error appears in the above-identified patent and that said Letters Patent is hereby corrected as shown below:

In column 7, line 37, delete "incorpating" and insert -- incorporating --, therefor.

Signed and Sealed this
Nineteenth Day of April, 2011

David J. Kappos
*Director of the United States Patent and Trademark Office*